Figure 1:
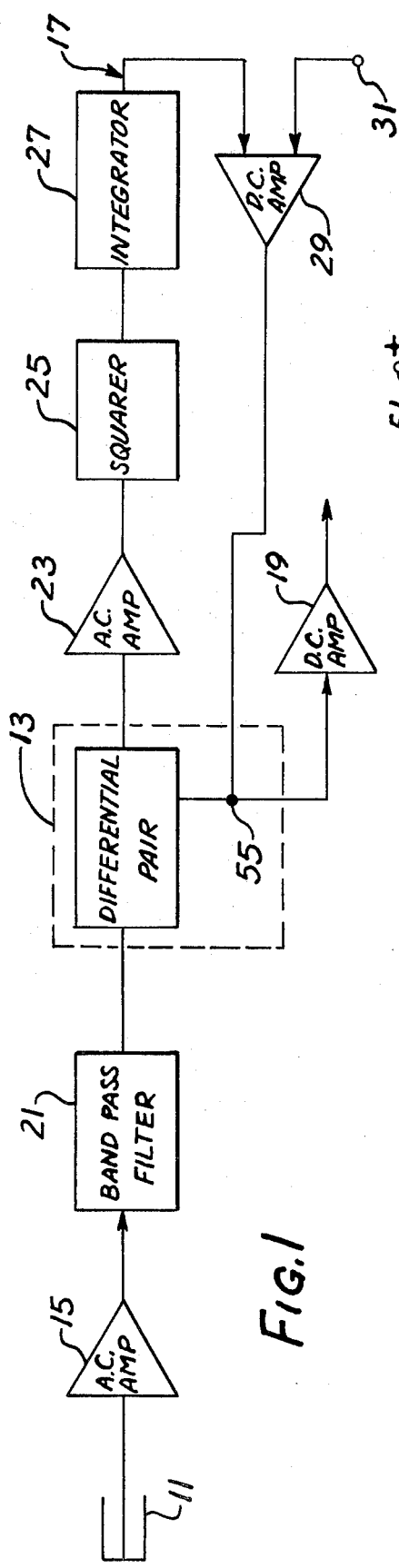

United States Patent [19]

Corte et al.

[11] 4,001,590
[45] Jan. 4, 1977

[54] RADIATION FLUX MEASURING DEVICE

[75] Inventors: Ernesto Corte, La Jolla, Calif.;
Pradeep Maitra, New Delhi, India

[73] Assignee: General Atomic Company, San Diego, Calif.

[22] Filed: Jan. 31, 1975

[21] Appl. No.: 545,973

Related U.S. Application Data

[62] Division of Ser. No. 393,444, Aug. 31, 1973, Pat. No. 3,916,193.

[52] U.S. Cl. .............................. 250/336; 250/392; 328/145
[51] Int. Cl.² .................. G01J 1/00; G06G 7/24
[58] Field of Search ........... 328/144, 145; 250/336, 250/390–392, 374

[56] References Cited
UNITED STATES PATENTS

| | | | |
|---|---|---|---|
| 2,796,533 | 6/1957 | Morton et al. | 250/336 |
| 2,818,504 | 12/1957 | DeShong | 250/374 |
| 2,975,370 | 3/1961 | Mosley et al. | 328/145 |
| 3,500,198 | 3/1970 | Kaiser et al. | 328/145 |
| 3,579,127 | 5/1971 | Thomas | 328/145 |
| 3,657,528 | 4/1972 | Plante | 328/145 |
| 3,681,618 | 8/1972 | Blackmer | 328/145 |
| 3,683,275 | 8/1972 | Fowler | 328/145 |
| 3,795,868 | 3/1974 | Ohme et al. | 328/144 |

Primary Examiner—Harold A. Dixon
Attorney, Agent, or Firm—Fitch, Even, Tabin & Luedeka

[57] ABSTRACT

A radiation flux measuring device is described which employs a differential pair of transistors, the output of which is maintained constant, connected to a radiation detector. Means connected to the differential pair produce a signal representing the log of the a-c component of the radiation detector, thereby providing a signal representing the true root mean square logarithmic output.

3 Claims, 2 Drawing Figures

RADIATION FLUX MEASURING DEVICE

This application is a division of Ser. No. 393,444 filed Aug. 31, 1973, now U.S. Pat. No. 3,916,193.

This invention relates to the measurement of radiation flux and, more particularly, to a radiation flux measuring device which utilizes the statistical fluctuations of a radiation detector as a measure of radiation flux.

In the measurement of radiation flux, the simple expedient of counting pulses representative of nuclear particles is often inadequate. At high radiation flux rates, counting techniques are incapable of achieving the resolution necessary for accurate flux measurement.

A flux measuring technique which may be successfully used for relatively high radiation flux rates utilizes the statistical fluctuations or a-c component in the signal from a radiation detector as a measure of radiation flux. The mean square voltage of the statistical or a-c signal is proportional to the radiation flux. In order to cover a wide range, devices employing this technique have typically utilized an output representative of the logarithm of the root mean square voltage of the statistical signal.

Prior art devices of the type described have often employed direct log conversion of the statistical signal output of the radiation detector, such as by the utilization of a-c or d-c logarithmic feedback amplifiers. This type of circuitry tends to be complex and therefore relatively expensive. Because of the complexity, some inaccuracy may be inherent in such devices. Moreover, many radiation flux measuring devices of the prior art do not provide a logarithmic output representative of the true root mean square output of the radiation detector.

It is an object of the present invention to provide an improved radiation flux measuring device.

Another object of the invention is to provide an improved radiation flux measuring device which utilizes the statistical fluctuations of a radiation detector as a measure of radiation flux.

It is another object of the invention to provide a radiation flux measuring device of the type described which provides a logarithmic output representing the true root mean square of the statistical fluctuations of a radiation detector.

It is another object of the invention to provide a radiation flux measuring device which is relatively low in cost and reliable of construction.

Figure 2:
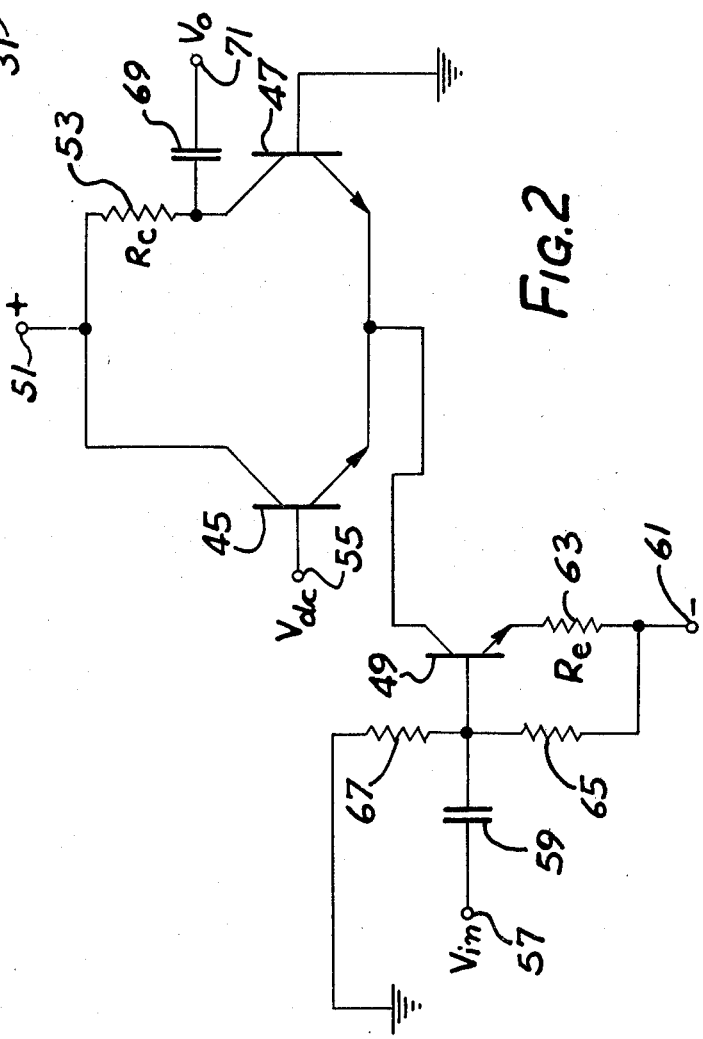

Other objects of the invention will become apparent to those skilled in the art from the following description, taken in connection with the accompanying drawings wherein:

FIG. 1 is a schematic block diagram of a radiation flux measuring device constructed in accordance with the invention; and FIG. 2 is a schematic block diagram illustrating, in greater detail, a portion of the device of FIG. 1.

Very generally, the radiation flux measuring device of the invention comprises a radiation detector 11 for producing an output having an a-c component representing radiation flux. A differential pair 13 is also provided, and means 15 apply the a-c component of the radiation detector to the differential pair. A feedback loop 17 maintains the output of the differential pair constant. Means 19 are coupled to the differential pair for deriving a signal representing the log of the root mean square of the a-c component.

Referring now more particularly to FIG. 1, a general form of the device of the invention is illustrated. The radiation detector 11 may be any suitable type of detector such as a fission chamber. As is known to those skilled in the art, a fission chamber comprises a pair of electrodes arranged in a suitable configuration across which a d-c bias voltage is maintained. The surfaces of the electrodes are coated with U 235 and an incident thermal neutron will produce two fission fragments of considerable energy. When one of these fission fragments crosses the gap between the electrodes, as is highly probable, an ionized track is produced extending between the electrodes. The electric field produced by the bias voltage between the electrodes causes the electrons and positive ions to be accelerated across the gap, thereby producing a current pulse.

The average number of current pulses per second produced in the radiation detector 11 is proportional to the radiation flux. The time between pulses, however, follows a statistical distribution about the average time. By using the statistical fluctuations of the signal, namely, the a-c component of the output of the radiation detector, the mean square voltage of the statistical signal will provide an indication of the radiation flux.

In the device illustrated in FIG. 1, the radiation detector 11 is connected to an a-c amplifier or preamplifier 15. The output of the preamplifier is passed through a band pass filter 21 which limits the signal to a band. This band is optimized to minimize processing error in the following circuitry and to achieve the required signal response. The band limited signal from the band pass filter is then passed into a differential pair 13. As will be explained, the differential pair is controlled by feedback signals to provide a constant voltage output.

The output of the differential pair 13 is applied to an a-c amplifier 23 and the output of the a-c amplifier is applied to the feedback loop or circuit 17. The feedback circuit 17 includes a squarer 25 and an integrator 27. The d-c output of the integrator is applied to a d-c amplifier 29 which compares the output signal from the integrator with a signal from a d-c reference source 31. The difference signal is amplified by the d-c amplifier 29 and applied to the differential pair 13. This signal is used to control the differential pair such that the output of the differential pair is held constant.

The differential pair 13 is illustrated more particularly in FIGURE 2. The differential pair includes transistors 45 and 47, which are of the NPN type having their emitters connected to the collector of an NPN transistor 49. The collector of the transistor 45 is connected directly to a source 51 of positive potential, and the collector of the transistor 47 is connected through a resistor 53 to the source 51 of positive potential. A terminal 55 is coupled to the base of the transistor 45, and the base of the transistor 47 is grounded.

Input to the differential pair is provided from an input terminal 57 through a capacitor 59 to the base of the transistor 49. Bias for the transistor 49 is provided from a negative potential source 61 through an emitter resistor 63, and through a base resistor 65. The base of the transistor 49 is connected to ground through a resistor 67. The output signal from the differential pair is derived through an output capacitor 69 at an output terminal 71.

For the differential pair shown in FIG. 2, the output voltage at the terminal 71 is equal to the expression:

$$\frac{R_c}{R_e} \times \frac{1}{1 + e^{V_{dc}/V_T}} \times V_{in}.$$

In the foregoing expression:
$R_c$ = the resistance of resistor 53,
$R_e$ = the resistance of resistor 63,
$V_{dc}$ = the d-c voltage at the terminal 55,
$V_T$ = $(kt/q)$, and
$V_{in}$ = the input voltage at the terminal 57.
If $e^{V_{dc}/V_T} >>> 1$, then the voltage out is:

$$V_o = (R_c/R_e) \times e^{V_{dc}/V_T} \times V_{in}.$$

Then, if $V_o$ is held constant by varying $V_{dc}$, $$V_{in} = (V_o R_e/R_c) \times {V_{dc}/V_T} = k e^{V_{dc}/V_T}$$

Thus, $V_{dc} = V_T \log_n k\, V_{in}$, namely, an output signal proportional to the log of the radiation flux.

Returning now to FIG. 1, the feedback loop 17 is used to hold the output voltage at the terminal 71 (FIG. 2) constant. In this manner, the output voltage at the terminal 55 provides a d-c voltage with the required log root mean square relationship to the input voltage at the terminal 57. The final amplifier 19 may be used for slope and off-set adjustments.

It may therefore be seen that the invention provides an improved radiation flux measuring device. The device of the invention is capable of producing an output representative of the log of the root mean square voltage of the statistical fluctuations of a radiation detector over a range of up to seven decades. The device is simple of construction and reliable of operation, and the output provided is the true root mean square log.

Various modifications of the invention in addition to those shown and described herein will become apparent to those skilled in the art from the foregoing description and accompanying drawings. Such modifications are intended to fall within the scope of the appended claims.

What is claimed is:

1. A radiation flux measuring device comprising, a radiation detector for producing an output having an a-c component representing radiation flux, a differential pair of transistors having a first input to one of said transistors, a second input to both of said transistors, and an output at the other of said transistors, means for applying the output of said radiation detector to said second input of said differential pair, a feedback loop connected from said output of said differential pair to said first input thereof for maintaining the output of said differential pair constant, said feedback loop including squaring and integrating means, and means for providing an output representing the signal at first said input.

2. A radiation flux measuring device comprising, a radiation detector for producing an output having an a-c component representing radiation flux, a differential pair of transistors and means coupling same to provide attenuation of the output of said radiation detector, a feedback loop including squaring means and integrating means and means for providing a d-c error signal to said differential pair representative of the deviation of the squared and integrated output thereof from a predetermined level, and means for providing an output representing the feedback signal of said feedback loop which is applied to said differential pair, said output being proportional to the log of the rms value of the a-c component of the output of said radiation detector.

3. A radiation flux measuring device according to claim 2 wherein said differential pair comprise a pair of NPN transistors having coupled emitters with the emitter-collector, circuit of one of said transistors having a higher series resistance than the other, means for applying a signal across the emitter to collector circuits of both transistors which is linearly related to the output of said radiation detector, said feedback loop being connected to the base of one of said transistors for controlling the output of said differential pair, the output of said differential pair being derived at the collector of the other of said transistors.

* * * * *

UNITED STATES PATENT OFFICE
CERTIFICATE OF CORRECTION

Patent No. 4,001,590          Dated January 4, 1977

Inventor(s) Ernesto Corte et al.

It is certified that error appears in the above-identified patent and that said Letters Patent are hereby corrected as shown below:

Column 3, line 5, that portion of the equation reading $e^{V_{dc}1V_T}$ should read $e^{V_{dc}/V_T}$.

Column 3, line 15, that portion of the equation reading $e^{V_{dc}1V_T}$ should read $e^{-V_{dc}/V_T}$.

Column 3, line 17, that portion of the equation reading $V_{dc}/V_T$ should read $e^{V_{dc}/V_T}$.

Signed and Sealed this fifth Day of July 1977

[SEAL]

Attest:

RUTH C. MASON
*Attesting Officer*

C. MARSHALL DANN
*Commissioner of Patents and Trademarks*